US012646940B2

(12) United States Patent
    Karjalainen et al.

(10) Patent No.: US 12,646,940 B2
(45) Date of Patent: Jun. 2, 2026

(54) FREQUENCY REGULATION IN AN AC POWER SUPPLY SYSTEM

(71) Applicant: Eaton Intelligent Power Limited, Dublin (IE)

(72) Inventors: Aleksi Mikael Karjalainen, Espoo (FI); Janne Mikael Paananen, Jyväskylä (FI); Tuomo Matias Kohtamaki, Helsinki (FI)

(73) Assignee: EATON INTELLIGENT POWER LIMITED, Dublin (IE)

( * ) Notice: Subject to any disclaimer, the term of this patent is extended or adjusted under 35 U.S.C. 154(b) by 174 days.

(21) Appl. No.: 18/558,930

(22) PCT Filed: May 4, 2022

(86) PCT No.: PCT/EP2022/025204
    § 371 (c)(1),
    (2) Date: Nov. 3, 2023

(87) PCT Pub. No.: WO2022/233457
    PCT Pub. Date: Nov. 10, 2022

(65) Prior Publication Data
    US 2024/0243578 A1     Jul. 18, 2024

(30) Foreign Application Priority Data
    May 5, 2021     (GB) ..................................... 2106426

(51) Int. Cl.
    *H02J 3/24*          (2006.01)
    *H02J 3/0014*        (2026.01)
         (Continued)

(52) U.S. Cl.
    CPC ............ *H02J 3/00142* (2026.01); *H02J 3/32* (2013.01); *H02J 3/381* (2013.01); *H02J 9/06* (2013.01)

(58) Field of Classification Search
    CPC .... H02J 3/241; H02J 3/32; H02J 3/381; H02J 9/06
         (Continued)

(56) References Cited

U.S. PATENT DOCUMENTS 10,615,597 B2     4/2020   Taimela et al.
2013/0169309 A1   7/2013   Bickel
         (Continued)

FOREIGN PATENT DOCUMENTS

WO        2020/236826 A1    11/2020

OTHER PUBLICATIONS

Nimish Soni, et al., "Improvement of Transient Response in Microgrids Using Virtual Inertia", IEEE Transactions on Power Delivery, IEEE Service Center, New York, NY, US, vol. 28, No. 3, Jun. 10, 2013 (Jun. 10, 2013 ), pp. 1830-1838, XP011516040, ISSN: 0885-8977, DOI: 10.1109/TPWRD.2013.2264738 Section IV.
         (Continued)

*Primary Examiner* — Hal Kaplan
(74) *Attorney, Agent, or Firm* — LEYDIG, VOIT & MAYER, LTD.

(57)          ABSTRACT

A system for frequency regulation in a AC power supply system is disclosed, wherein the system comprises an uninterruptible power supply being electrically connected to the AC power supply system and comprising a phase-locked loop and/or a frequency-locked loop for monitoring the frequency of an AC input voltage received from the AC power supply system, wherein the phase-locked loop and/or the frequency-locked loop is/are designed to be operated with an operation frequency being higher than a nominal grid frequency and being selected to detect a deviation of the monitored frequency from the nominal grid frequency within a predefined time span after a frequency drop-off of the monitored frequency occurred, wherein a control signal
         (Continued)

(19) is generated based on the detected deviation of the monitored frequency from the nominal grid frequency, and wherein the generated control signal is used to regulate the power flow between the uninterruptible power supply.

12 Claims, 3 Drawing Sheets

(51) Int. Cl.
    *H02J 3/32*            (2026.01)
    *H02J 3/38*            (2026.01)
    *H02J 9/06*            (2006.01)
(58) Field of Classification Search
    USPC ......................................................... 307/102
    See application file for complete search history.

(56)                     References Cited

U.S. PATENT DOCUMENTS

2017/0179722 A1     6/2017   Porter
2022/0216726 A1*   7/2022   Kamalasadan ....... H02J 7/0063

OTHER PUBLICATIONS

Walker L H: "10-MW GTO Converter for Battery Peaking Service", IEEE Transactions on Industry Applications, IEEE Service Center, Piscataway, NJ, US, vol. 26, No. 1, Feb. 28, 1990 (Feb. 28, 1990), pp. 63-72, XP000128665,ISSN: 0093-9994, DOI: 10.1109/28. 52675 abstractSection "Controls Implementation" on p. 67.

* cited by examiner

FREQUENCY REGULATION IN AN AC POWER SUPPLY SYSTEM

TECHNICAL FIELD

This specification relates to frequency regulation in an AC (Alternating Current) power supply system and particularly discloses a system for frequency regulation in an AC power supply system.

BACKGROUND

Increased amounts of distributed energy resources are causing challenges for the (AC) grid stability through increased volatility in electric power generation and lower electric power supply system inertia. Low-inertia situations are especially critical in islanded/isolated electric power supply systems (power systems), where the primary (electric) power generation is for example provided by diesel/natural gas-based synchronous generators. The low inertia in these systems may lead to fast and high frequency deviations in the presence of changes in load or disturbances in power generation, and this problem may be further impacted by slow dynamic response of some generating technologies.

To maintain the frequency within the limits in larger power systems, frequency containment reserves can be used to supplement the mandatory frequency regulation. These have been traditionally hydro power, gas turbines and engines, diesel generators and nowadays also battery energy storage systems (BESS). The traditional forms of power generation incur challenges to provide fast enough response for worst case events, and therefore power electronic converters with energy storage devices are seen as promising alternative, as they can provide very fast responses to frequency disturbance. So far, the use of synthetic, or emulated, inertia has been studied relating to power electronic converters of Type 4 windmills and BESS, that are purposely built to serve grid and power generation.

The publication "Frequency-Freezing FLL for Enhanced Synchronization Stability of Grid-Following Converters during Grid Faults", Taul et al, 2020 IEEE, proposes a method for enhanced transient stability during severe grid faults for more complex synchronization structures designed to deal with asymmetrical fault conditions by freezing the frequency of a stationary-reference frame frequency-locked loop (FLL).

The publication "Stability-Oriented Design of Frequency Drift Anti-Islanding and Phase-Locked Loop Under Weak Grid", Kim et al, 2017 IEEE, analyses the stability of a grid-tied, power conditioning system (PCS) equipped with frequency drift anti-islanding.

The US patent U.S. Pat. No. 10,615,597B2 relates to power systems and, more particularly, to island grid power supply systems and methods, and describes an island grid power supply system, which includes at least one energy storage unit and at least one converter coupled to the at least one energy storage unit and configured to be coupled to an island grid. The system further includes a control circuit configured to detect a frequency variation of the island grid and to responsively cause the at least one converter to transfer power between the at least one energy storage unit and the island grid. The control circuit may be configured to cause a power transfer between the energy storage unit and the island grid to compensate for a load response delay of at least one generator coupled to the island grid.

The US patent application US2013/0169309A1 describes systems and methods for evaluating the stability of an islanded electrical system (off-grid) using high-speed frequency measurements of the electrical signal supplied by an alternate power source in the islanded electrical system. Additional inputs may include status signals from an automatic transfer switch, a generator, and loads within the islanded electrical system. The high-speed frequency measurements have a resolution sufficient to enable analysis of any combination of the frequency magnitude (e.g., sudden increase), frequency slew rate (e.g., frequency rate of change), frequency rate of recovery (e.g., frequency recovery time), or frequency oscillations (e.g., frequency ringing around the nominal value before settling) to indicate the presence of an actual or impending instability of the islanded electrical system. The frequency referred to herein corresponds to the frequency at which an alternating current supplied by the alternate power source is cycling.

The US patent application US2017/179722A1 relates generally to electrical systems, and more particularly, to regulating the frequency of electrical signals on an electrical grid. An exemplary electrical system includes a sensing arrangement coupled to an electrical grid interface to measure an electrical characteristic of the electrical grid interface, a power conversion module having an output coupled to the electrical grid interface, and a control module coupled to the sensing arrangement and the power conversion module. The control module determines an estimated frequency of the electrical characteristic based on a phase error corresponding to a measured value of the electrical characteristic from the sensing arrangement, determines a frequency correction power command configured to regulate the frequency of the electrical characteristic of the electrical grid interface to the target frequency based on a difference between the estimated frequency and a target frequency, and operates the power conversion module in accordance with the frequency correction power command.

SUMMARY

This specification describes a system for frequency regulation in an AC power supply system.

According to an aspect of this specification, a system for frequency regulation in a AC power supply system is provided, wherein the system comprises an uninterruptible power supply (UPS) being electrically connected to the AC power supply system and comprising a phase-locked loop or a frequency-locked loop for monitoring the frequency of an AC input voltage received from the AC power supply system, wherein the phase-locked loop (PLL) or the frequency-locked loop (FLL) is designed to be operated with an operation frequency being higher than a nominal grid frequency and being selected to detect a deviation of the monitored frequency from the nominal grid frequency within a predefined time span after a frequency drop-off of the monitored frequency occurred, wherein a control signal is generated based on the detected deviation of the monitored frequency from the nominal grid frequency, and wherein the generated control signal is used to regulate the power flow between the uninterruptible power supply and the grid until the monitored frequency is within a predefined range around the nominal grid frequency. This system provides support to the AC power supply system, for example a low-inertia generator-fed power supply system, by enabling a control system of the UPS to react to frequency deviations from the nominal grid frequency. The system particularly utilizes a fast, sub-cycle frequency measurement from the PLL or FLL provided by an internal measurement system in an UPS to implement the frequency regulation. By using the PLL or FLL, a fast frequency measurement may be provided, which makes it possible to monitor the frequency of the AC input voltage even in an initial frequency drop-off, and, thus, allows the UPS to almost immediately react to detected frequency deviations.

In an embodiment, the phase-locked loop or the frequency-locked loop may be designed to be operated with an operation frequency in the kHz range, particularly an operation frequency of 2250 Hz. The frequency of the AC input voltage may be calculated from a digital PLL control loop as the frequency is proportional to a phase angle correction made by the PLL function. The phase angle corrections are usually made at a much higher frequency than the nominal grid frequency of for example 50/60 Hz, particularly they may be made in the kHz frequency range, and more particularly with 2250 Hz.

In embodiments, the control signal may be generated when the detected deviation of the monitored frequency from the nominal grid frequency is larger than a specified tolerance. Thus, the UPS frequency regulation may be only initiated upon larger frequency deviations, and not when only smaller deviations caused for example due to uncritical frequency fluctuations are monitored. The implementation of such a threshold can also be used to form a frequency-power droop scheme. For example, when the monitored frequency is out of a specified tolerance or the detected frequency deviation is larger the corresponding threshold, the UPS may be controlled to regulate its input power flow so that the monitored frequency is brought back within the specified tolerance. With several thresholds, a desired droop curve may be implemented.

In a specific embodiment, the control signal may be generated to regulate the input power of the uninterruptible power supply at its defined maximum power when the detected deviation of the monitored frequency from the nominal grid frequency reaches a configured maximum deviation of the monitored frequency from the nominal grid frequency. Thus, a limit of the UPS input power regulation is defined when the configured maximum deviation is reached, which may protect the UPS from overload conditions. This also allows to define a desired droop curve.

In embodiments, the control signal may be generated also based on a rate of change of the detected deviation of the monitored frequency, wherein particularly a frequency droop curve for regulating the input power drawn by the uninterruptible power supply may be modified depending on the rate of change of the detected deviation. By additionally taking the rate of change of the detected deviation of the monitored frequency into account when generating the control signal, an even faster regulation response may be achieved. The measured rate of change of the detected deviation of the monitored frequency or rate of change of frequency (RoCoF) can be used in a droop-like manner or to form an adaptive droop scheme that may modify a frequency droop curve as a function of RoCoF.

In further embodiments, the AC power supply system may be a low-inertia power supply system, particularly an islanded/isolated power supply system fed by a generator system, particularly a synchronous generator system. Low-inertia power supply systems, for example standby generating sets as particularly used in islanded grids may particularly suffer from large load steps, for example when loads such electric motors are started, which may incur significant frequency fluctuations and deviations from the nominal grid frequency beyond tolerable values. Thus, particularly such AC power supply systems may require a fast frequency regulation as it may be provided with the system disclosed herein.

In yet further embodiments, the uninterruptible power supply may be a three-phase uninterruptible power supply configured to enable a fast frequency regulation to the AC power supply system and to support the AC power supply system in transient situations.

In still further embodiments, the system may further comprise means for monitoring the voltage and/or current of the AC input voltage; and means for providing system information about the quality of the AC input voltage based on the monitored frequency, voltage and/or current of the AC input voltage. The means for providing the system information may comprise for example a display for visually signaling the monitored values or corresponding information such as alerts, a communication interface for transmitting the monitored values to for example external devices such as a smartphone, tablet computer, desktop computer, laptop computer, server, a storage for storing the monitored values for example in a log file.

In still further embodiments, the system may be an uninterruptible power supply system comprising a single or multiple uninterruptible power supply unit(s) or module(s). For example, the system may comprise a single UPS unit or module for each phase of the AC power supply system. Several UPS units or modules may also be used to provide sufficient regulation power for different requirements.

The details of one or more embodiments are set forth in the accompanying drawings and the description below. Other features and advantages will be apparent from the description and drawings, and from the claims.

DETAILED DESCRIPTION

Figure 1:
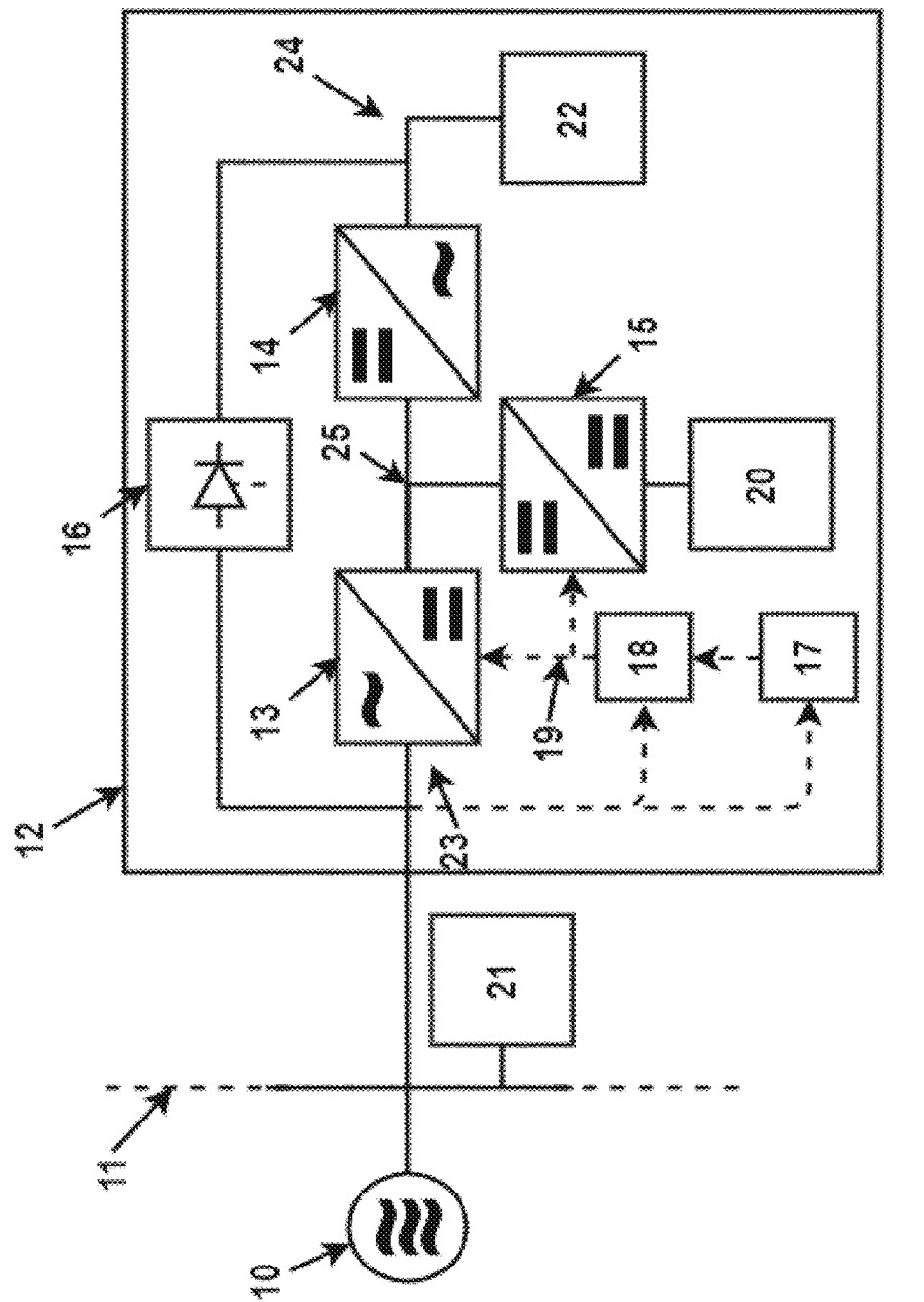
FIG. 1 shows a block diagram of an embodiment of a system for frequency regulation in an AC power supply system.

In the following, functionally similar or identical elements may have the same reference numerals. Absolute values are shown below by way of example only and should not be construed as limiting.

The herein disclosed frequency regulation system is particularly aimed to solve the problem introduced by the low inertia in generator (diesel or natural gas) fed islanded/isolated AC power supply systems. The performances of these types of generators on their own are relatively poor in regards of inertial response due to sudden load changes. To contain the frequency in the AC power supply system (also designated herein as grid frequency) within operable limits around a nominal grid frequency such as for example 50/60 Hz, a supplementary frequency control may be provided with the herein disclosed frequency regulation system, especially if the load changes in the AC power supply system are big. A part of the problem may be also the high RoCoF in these situations, which makes measuring the grid frequency in the AC power supply system difficult. The frequency regulation method as described herein thus may accurately track a rapidly changing frequency of an AC voltage generated in the AC power supply system and act accordingly.

A frequency stability issue may particularly be incurred due to two main changes in an AC power supply system: firstly, a rapid change of the load (demand) in the system may influence the frequency stability, and, secondly, a rapid change in the AC power generation capacity (supply) may also influence the frequency stability. For example, in an AC power supply system with several power generators operating in parallel and supplying the system, a sudden loss of one or more generator units may cause a sudden increase in the load for the remaining generator units. The herein disclosed frequency regulation system may help to manage particularly these transients in demand-supply balance and maintain the frequency within acceptable limits for power system and generating units.

The herein disclosed frequency regulation system may utilize a three phase UPS device to enable fast frequency regulation to the AC power supply system and supports the feeding low-inertia AC power supply system in transient situations. In more specific terms, the operation and performance of an AC power supply system particularly comprising a synchronous generator system is supported in power disturbances, i.e., load steps.

A modern UPS may be already able to provide frequency regulation services to the feeding grid, but this functionality is relatively slow and will not work in low-inertia islanded grids e.g., systems fed by standby generating sets. Subjecting a generating set to a large load step will cause the generator to slow down significantly which will in turn decrease the frequency of the system. The conventional frequency regulation methods are designed to work in ~1 Hz/s-range but when the power system is reduced down to an islanded/isolated system, the RoCoF-values change drastically.

FIG. 1 shows an embodiment of the herein disclosed system employed with an AC power supply system 10, which is particularly suitable for islanded/isolated systems with low-inertia AC power supply systems. The system comprises an UPS 12 connected via a grid 11 with the AC power supply system 10, for example a low-inertia synchronous generator. The UPS 12 comprises an AC supply input 23 for connection with the grid 11 to receive AC power and an AC supply output 24 for connecting with a load 22. The AC input 23 is connected through a rectifier 13 to a DC-link 25 of the UPS 12. The DC voltage is then converted back to AC through an inverter 14 to form an AC output voltage for the UPS load 22. The output 24 can also be supplied by an alternative bypass connection via a static bypass switch 16. A DC-source (for example a battery) 20 is connected to the DC-link 25 through a DC/DC converter 15.

Under normal operation conditions, the load 22 is supplied with AC power from the AC power supply system 10 via the grid 11 and the rectifier 13, the DC-link 25 and the inverter 14. In case of a power failure, for example when the AC power supply system 10 fails, the load 22 can be supplied with AC power generated by the UPS 12 from the DC-source 20, particularly an energy storage such as rechargeable battery. The DC power delivered by the battery 20 is controlled by the DC/DC converter 15. Under normal operation conditions, the DC/DC converter 15 charges the rechargeable battery 20 with AC power received from the grid 11.

The grid 11 has a nominal grid frequency, for example 50/60 Hz, of the AC power supply delivered via the grid 11. However, the UPS output load 22 and input-side load 21 may change its power demand so that such large power steps may occur in the entire system, which may particularly have an impact on the grid frequency such that the later may more or less deviate from the nominal grid frequency.

The UPS 12 further comprises a control loop 17, for example a PLL or FLL, which is operated at a much higher operation frequency than the nominal grid frequency. For example, the operation frequency is 2250 Hz.

Therefore, in the herein disclosed system for frequency regulation the UPS 12 is configured to monitor its AC input (supply) voltage and detect the frequency via a control loop 17, particularly PLL or a FLL. With the control loop 17, a deviation of the monitored frequency from the nominal grid frequency such as for example 50/60 Hz may be detected quicker when the control loop 17 is operated with an operation frequency being higher than the nominal grid frequency. Particularly, the control loop 17, i.e., the PLL or FLL, is run at a much higher rate than the AC input voltage period is. This enables the herein described system to react much faster to particularly fast frequency deviations present in low-inertia power systems.

Typically, for example in utility grids, frequency regulation control loops utilize averaged frequency measurements over several line cycles. These kind of slower control loops is however not suitable for generator-fed low-inertia systems, where the frequency deviations are much more severe. The initial frequency drop of a synchronous generator, as calculated from the swing equation, is generally not even detected by conventional frequency control loops as the RoCoF-values may rise to tens of Hz/s for a brief period.

With the sub-cycle frequency measurement by the control loop 17 operated at a high operation frequency in the herein disclosed system, it is possible to monitor the AC input frequency even in the initial frequency drop-off, and thus allow the UPS 12 to react almost immediately.

The input frequency can be calculated in the control loop 17, which may be particularly a digital PLL control loop, as the frequency is proportional to the phase angle correction made by the PLL function. The phase angle correction is the adjustment that a controller of the control loop makes to track the AC input voltage's phase. These corrections may be made at a much higher rate than the AC input voltage period is: this was tested with an UPS that has a 2250 Hz PLL control loop.

The sub-cycle frequency measurement may be used by a controller 18 to generate a control signal 19 to control the UPS input power. UPS input power can be controlled by directly controlling power flow through the UPS AC input 23 connected to incoming AC supply from the grid 11, or by controlling the power drawn or fed to an energy storage, such as, but not limited to, the electrochemical battery 20. As a result, the UPS input power, that is the sum of power flowing to the load 22, UPS losses and power to/from the energy storage 20, can be positive or negative, depending on amount of the load 22 connected to the UPS 12 and the magnitude of the regulation response provided to the AC supply.

The controlled power or "power command" calculated from the input frequency measurement performed via the control loop 17 can be used to form a frequency-power droop control scheme implemented for example by a program executed by the controller 18. This way, when the monitored frequency is out of a specified tolerance, the UPS 12 may start regulating its power and when the frequency reaches a configured maximum/minimum, the UPS 12 may regulate at its defined maximum power. These threshold values can be configured to form a desired droop curve. Additionally, the RoCoF can be used as a secondary control input to enable even faster response. The measured RoCoF can be used in a droop-like manner, or it can be used to form an adaptive droop scheme that modifies the frequency droop curve as a function of RoCoF.

This frequency-based control method enables easy implementation and fast response, without delays of external communication and processing. As part of the herein disclosed system for frequency regulation, a UPS system that may be composed of a single UPS unit or module, or multiple UPS units or modules, may be monitoring its own AC input supply voltage, current and frequency. These measurements may be used to provide a UPS system information about the quality of incoming supply and whether the AC supply is within defined limits for normal operation. The same measurements are also used to provide information about the supply frequency to provide regulation responses. The information may be particularly provided via a display and/or communication interface of the UPS 12 under control of the controller 18. For example, the collected information about the incoming supply and/or the UPS AC supply limits etc. can be represented on the display and/or transmitted to an external device connected with the communication interface of the UPS 12.

The frequency regulation as disclosed herein is particularly based on the principle of regulating the power, flow of energy, between the UPS AC input port 23 (rectifier 13) and the UPS DC input (DC/DC converter 15 and DC-source 20, for example battery or supercapacitor or . . . ) and eventually controlling the UPS input power to regulate the AC supply frequency. For regulating the frequency, the reference for the DC/DC converter 15 may be regulated, and the rectifier 13 may adapt to this change, or vice versa. The result is the same, and the main principle is the controlling of the flow of energy rapidly between two sources, the AC input 23 and the DC input. Due to the sub-cycle detection of frequency deviations, the flow of energy may rapidly be controlled and, thus, the frequency be also rapidly regulated. The rectifier 13 may be a bi-directional rectifier, i.e., may allow an energy flow in both directions from input to output and vice versa. Thus, energy may flow from the grid 11 via the rectifier 13 into the UPS 12, but also back from the UPS 12 through the rectifier 13 to the grid 11. This allows to better utilize the UPS 12 to support the AC power supply system 10.

As shown in FIG. 1, the UPS 12 may be attached to the grid 11 in parallel to one or more loads 21. The UPS 12 supports the AC power supply system 10, for example a generator, by injecting power to the AC input 23 from a DC-source 20 such as a battery, or the UPS 12 may simply reduce its demand if having enough load 22.

Figure 2:
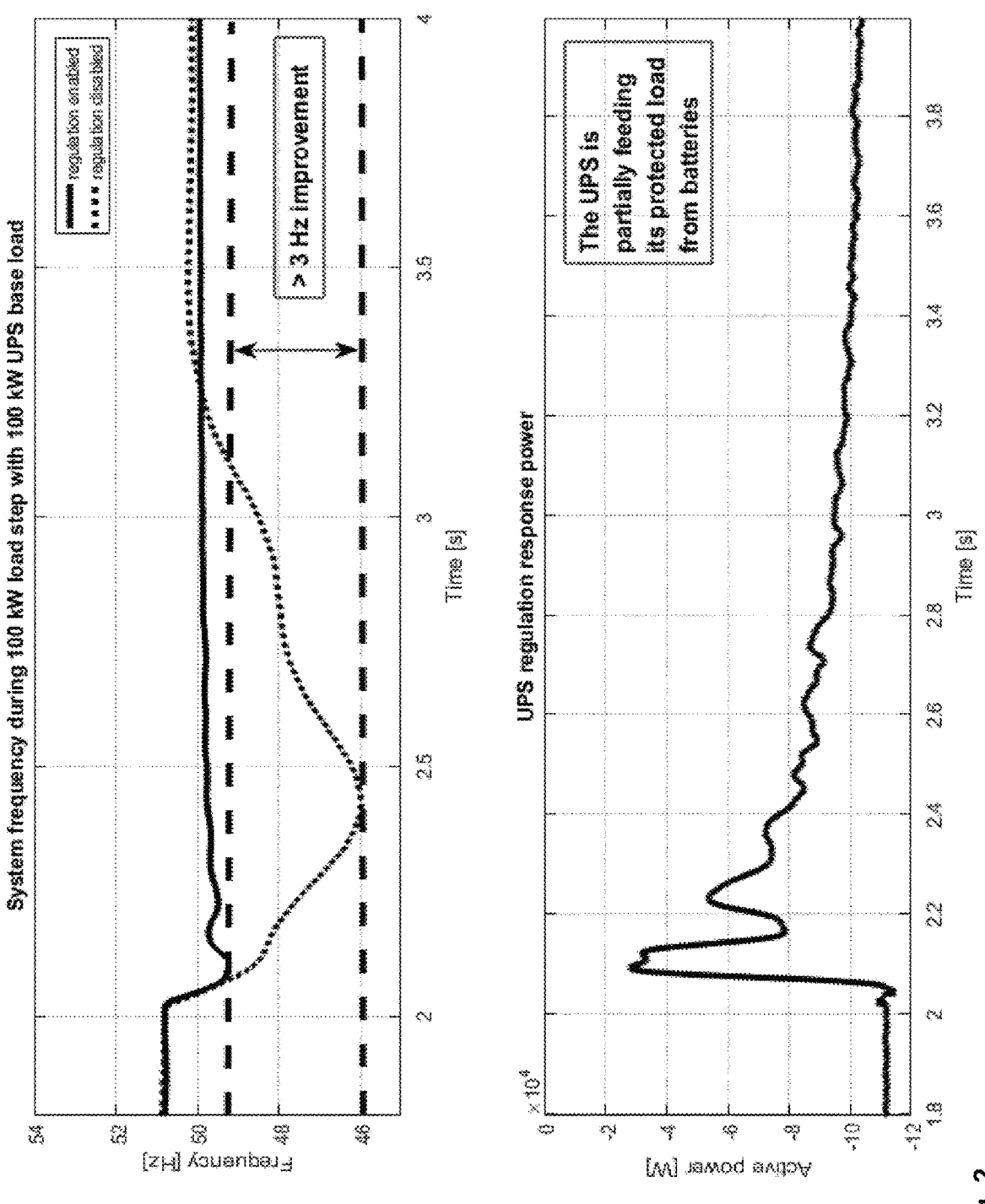
FIGS. 2 and 3 show two example traces of two system frequency during different load step and UPS base load combinations and the UPS regulation response power according to the system for frequency regulation in an AC power supply system.
Figure 3:
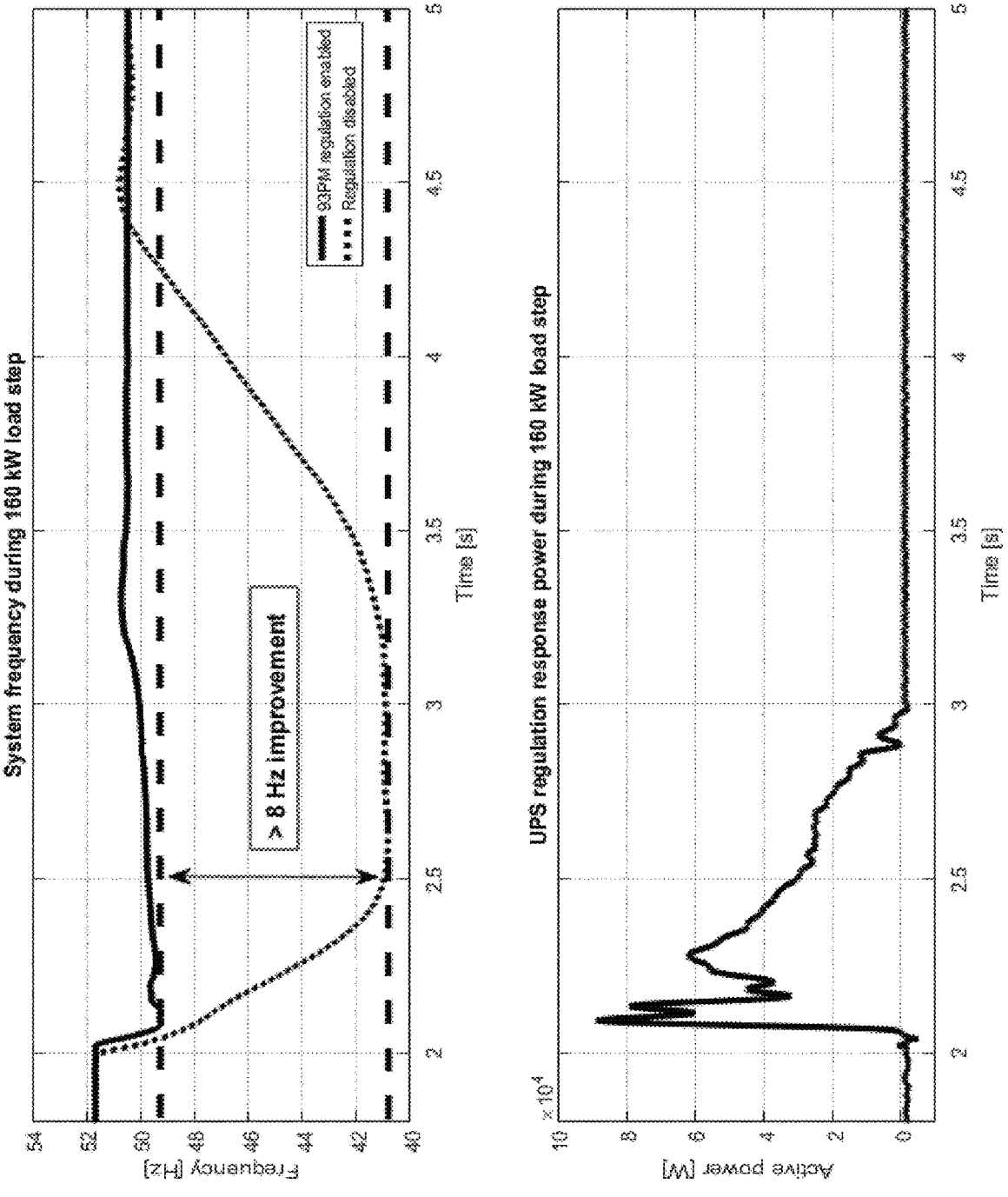

An implementation of the herein disclosed system was tested with an Eaton 93PM 200 kW three-phase double conversion UPS device in a small-scale isolated power system. The power system consisted of a 250 kVA diesel generator, the 93PM UPS and resistive load banks. The generator was subjected to different sized load steps and the system frequency was analyzed with and without the support of the UPS regulation algorithm. Some results of the tests are shown in the FIGS. 2 and 3. As can be seen from the traces of the top diagram FIG. 2, with the regulation according to the herein disclosed system enabled, a >3 Hz improvement in the frequency fluctuation compared to the disabled regulation can be achieved when a 100-kW load step with a 100 KW UPS base load occurs. The bottom diagram of FIG. 2 shows the UPS regulation response power. A further improvement of >8 Hz can be achieved even with a 160-kW load step, as shown in the diagrams from FIG. 3.

REFERENCE NUMERALS

10 AC Power supply system
11 AC power grid
12 UPS
13 Rectifier (AC/DC)
14 Inverter (DC/AC)
15 Battery converter (DC/DC)
16 Static bypass switch (SCR)
17 PLL/FLL
18 Controller
19 Control signal
20 DC-source (e.g., battery)
21 Input-side load
22 UPS output load
23 AC supply input connection
24 AC output connection
25 DC-link

The invention claimed is:

1. A system for frequency regulation in an AC power supply system, the system comprising:
an uninterruptible power supply comprising an AC supply input for connection via a grid with the AC power supply system and an AC supply output for connecting with a load,
wherein the AC supply input is connected through a rectifier to a DC-link of the uninterruptible power supply and the DC-link is connected through an inverter to form an AC output voltage for the load to the AC supply output,
wherein the uninterruptible power supply further comprises a phase-locked loop or a frequency-locked loop for monitoring the frequency of an AC input voltage received from the AC power supply system,
wherein the phase-locked loop or the frequency-locked loop is designed to be operated with an operation frequency being higher than a nominal grid frequency and being selected to detect a deviation of the monitored frequency from the nominal grid frequency within a predefined time span after a frequency drop-off of the monitored frequency occurred,
wherein the system is configured to generate a control signal based on the detected deviation of the monitored frequency from the nominal grid frequency, and
wherein the system is configured to use the generated control signal to regulate a power flow between the uninterruptible power supply and the grid until the monitored frequency is within a predefined range around the nominal grid frequency.

2. The system of claim 1, wherein the phase-locked loop or the frequency-locked loop is designed to be operated with an operation frequency in the kHz range.

3. The system of claim 2, wherein the phase-locked loop or the frequency-locked loop is designed to be operated with an operation frequency of 2250 Hz.

4. The system of claim 1, wherein the system is configured to generate the control signal when the detected deviation of the monitored frequency from the nominal grid frequency is larger than a specified tolerance.

5. The system of claim 4, wherein the system is configured to generate the control signal to regulate an input power of the uninterruptible power supply at its defined maximum power when the detected deviation of the monitored frequency from the nominal grid frequency reaches a config-ured maximum deviation of the monitored frequency from the nominal grid frequency.

6. The system of claim 1, wherein the system is further configured to generate the control signal also based on a rate of change of the detected deviation of the monitored fre-quency.

7. The system of claim 6, wherein a frequency droop curve for regulating an input power drawn by the uninter-ruptible power supply is modified depending on the rate of change of the detected deviation.

8. The system of claim 1, wherein the AC power supply system is a low-inertia power supply system.

9. The system of claim 8, wherein the AC power supply system is an islanded/isolated power supply system fed by a generator system.

10. The system of claim 9, wherein generator system is a synchronous generator system.

11. The system of claim 1, wherein the uninterruptible power supply is a three-phase uninterruptible power supply configured to enable a fast frequency regulation to the AC power supply system and to support the AC power supply system in transient situations.

12. The system of claim 1, wherein the uninterruptible power supply is an uninterruptible power supply system that comprises multiple uninterruptible power supply units or modules.

\* \* \* \* \*